United States Patent [19]

Stephan et al.

[11] Patent Number: 4,693,140

[45] Date of Patent: Sep. 15, 1987

[54] HOLLOW TUBULAR MEMBERS AND A METHOD OF MAKING SUCH MEMBERS

[75] Inventors: Walter A. Stephan, Braunau; Josef Knauseder, Aurolzmünster, both of Austria

[73] Assignee: Fischer Gesellschaft M.B.H., Ried im Innkreis, Austria

[21] Appl. No.: 925,529

[22] Filed: Oct. 28, 1986

Related U.S. Application Data

[63] Continuation of Ser. No. 528,154, Aug. 31, 1983, abandoned.

[30] Foreign Application Priority Data

Sep. 7, 1982 [AT] Austria .................................. 3337/82

[51] Int. Cl.⁴ ........................... G05G 1/00; F16C 7/00
[52] U.S. Cl. ...................................... 74/579 R; 74/587
[58] Field of Search ............ 74/579 R, 587; 403/259, 403/261, 258, 299, 342

[56] References Cited

U.S. PATENT DOCUMENTS

| | | |
|---|---|---|
| 2,723,426 | 11/1955 | Pelley et al. |
| 3,434,372 | 3/1969 | Delker ................................. 74/579 |
| 3,895,162 | 7/1975 | Lemont et al. |
| 4,126,659 | 11/1978 | Blad. |
| 4,353,267 | 10/1982 | Robert .............................. 74/579 R |
| 4,353,268 | 10/1982 | Picard et al. .......................... 74/587 |

FOREIGN PATENT DOCUMENTS

| | | |
|---|---|---|
| 347116 | 12/1978 | Austria. |
| 0012090 | 6/1980 | European Pat. Off. . |
| 0031648 | 7/1980 | European Pat. Off. . |
| 0028978 | 5/1981 | European Pat. Off. . |
| 645713 | 6/1937 | Fed. Rep. of Germany. |
| 1174049 | 7/1964 | Fed. Rep. of Germany. |
| 1604597 | 11/1970 | Fed. Rep. of Germany. |
| 2251435 | 3/1973 | Fed. Rep. of Germany. |
| 2401548 | 7/1974 | Fed. Rep. of Germany. |
| 3003906 | 9/1980 | Fed. Rep. of Germany. |
| 491913 | 2/1919 | France. |
| 1189383 | 3/1959 | France. |
| 2449818 | 9/1980 | France. |
| 2503024 | 10/1982 | France. |
| 619898 | 10/1980 | Switzerland. |
| 781925 | 8/1957 | United Kingdom. |
| 859067 | 1/1961 | United Kingdom. |
| 2040790 | 9/1980 | United Kingdom. |
| 2054083 | 2/1981 | United Kingdom. |
| 2085351 | 4/1982 | United Kingdom. |
| 2096530 | 10/1982 | United Kingdom. |

*Primary Examiner*—Gary L. Smith
*Assistant Examiner*—Rodney M. Lindsey
*Attorney, Agent, or Firm*—Fleit, Jacobson, Cohn & Price

[57] ABSTRACT

Hollow tubular members for the transmission of compressive, tensile, bending and torsional forces. The hollow member is made of fibre-reinforced plastics and comprises a tubular central portion and tapered conical end portions which form an integral whole with the central portion. A synthetic organic polymer is used as the reinforcing fibre.

5 Claims, 8 Drawing Figures

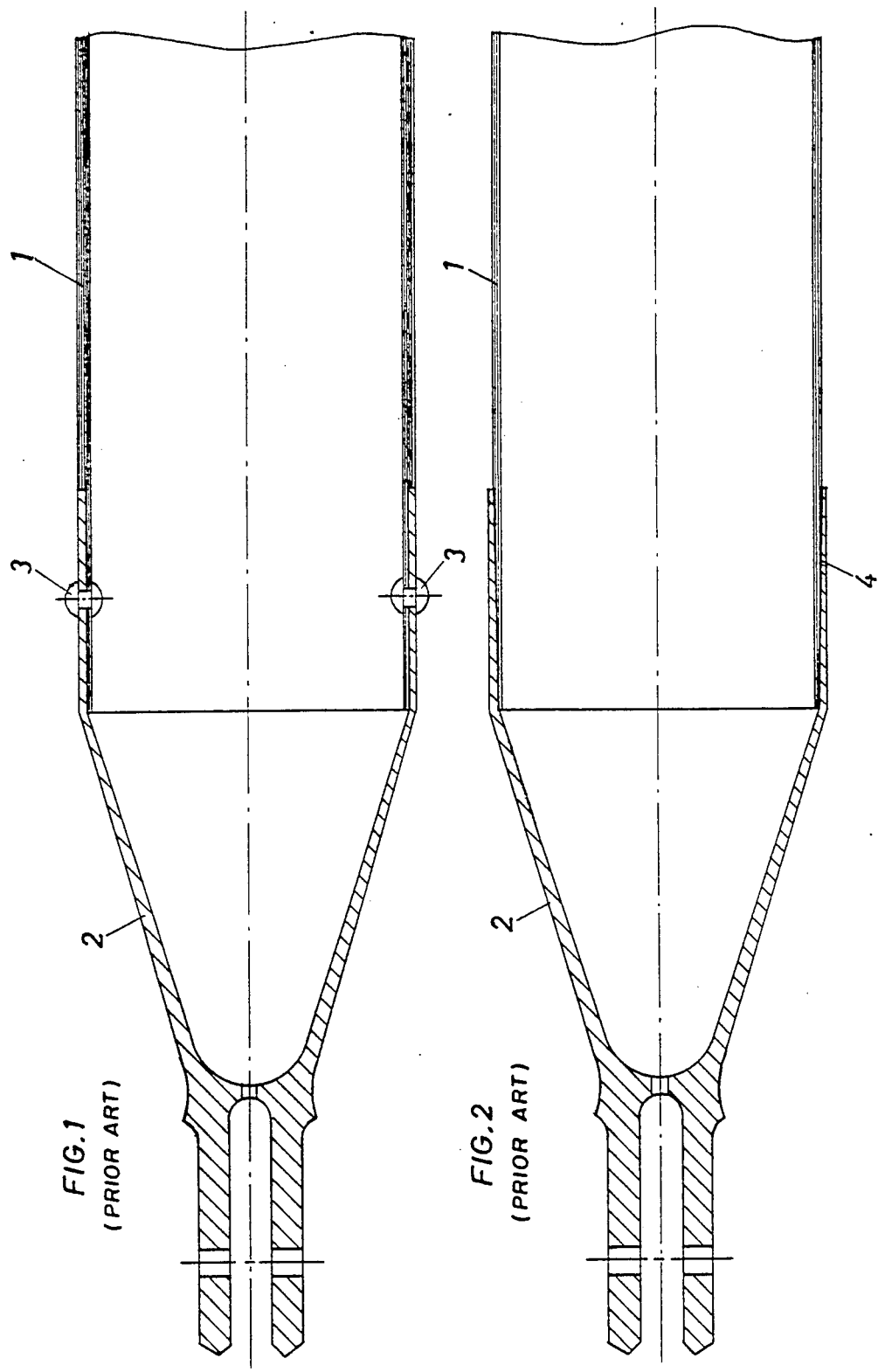

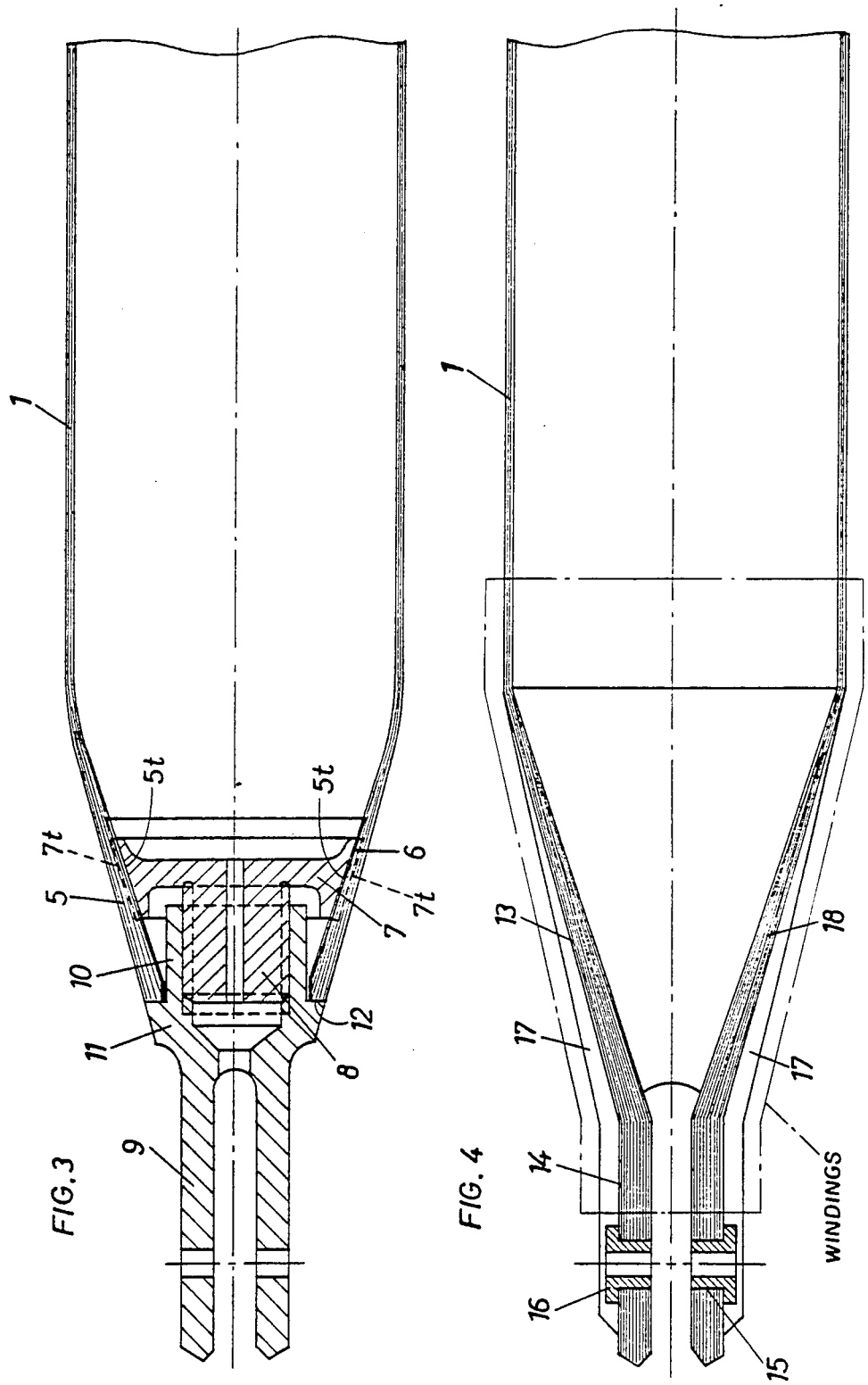

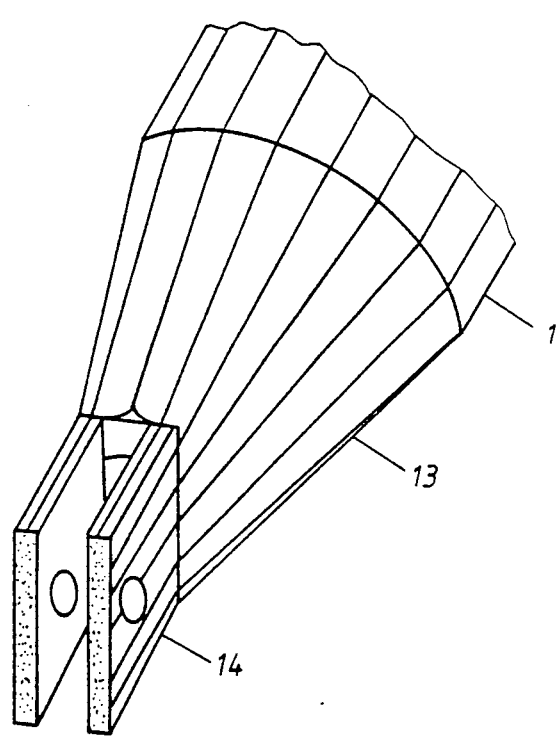

HOLLOW TUBULAR MEMBERS AND A METHOD OF MAKING SUCH MEMBERS

This application is a continuation of aplication Ser. No. 528,154, filed Aug. 31, 1983, now abandoned.

BACKGROUND OF THE INVENTION

The present invention relates primarily to hollow tubular members made of fibre-reinforced plastics materials. Such hollow members are primarily intended for use as struts in a structure or for transmitting compressive, tensile and torsional forces in vehicles such as space vehicles, aircraft and automotive vehicles. The present invention also relates to a process for manufacturing such hollow members.

DESCRIPTION OF THE PRIOR ART

In the art of vehicle construction, which term as used herein encompasses space vehicles, aircraft and automotive vehicles, composite fibre materials are being increasingly used instead of metals. This is because they offer a strength and rigidity comparable with that of metals whilst components made therefrom are considerably lighter than corresponding metallic components. As the mechanical properties of fibre composites are anisotropic, which is not true of metals, components which are optimally suited to the incidence of loads can be manufactured using such materials and a considerable saving in weight can thus be achieved.

In the light construction industry, the so-called "winding" technique has been used for the manufacture of force-transmitting shafts and tubular struts. However, if these cylindrical components are manufactured from fibre composite materials, problems arise in the design of the force accepting or connecting region. At the present time, fibre-reinforced plastics components are provided with metal fittings or mountings which are subsequently secured by bonding or by mechanical interlocking using suitable connectors such as rivets.

Components produced in this manner are therefore a compromise between metallic components and fibre composite components and hence have a weight disadvantage compared with components in which the connecting region is made of fibre composite material, because of the necessary multiple dimensioning of the connecting region.

OBJECTS OF THE INVENTION

The present invention therefore seeks to provide hollow members suitable for the purposes described hereinbefore which can be used directly as components or can be provided with a simple thread in the force-receiving connecting region. The invention also seeks to provide a process for producing such hollow members.

SUMMARY OF THE INVENTION

According to the present invention, there is provided a rod-shaped hollow member of fibre-reinforced plastics material suitable for the transmission of compressive, tensile, bending and torsional forces in vehicles comprising a substantially cylindrical central portion integrally formed with end regions of reduced internal cross-section compared with the central portion.

In a preferred embodiment of the present invention, there is provided an arrangement in which the end portions have an internal cross-section which is bounded by two straight parallel walls having a length not less than the radius of the central section nor greater than the diameter thereof, in which the parallel connecting ends contain holes which extend normally to the flat walls and cut the longitudinal axis of the tube, these holes being used for application of the tensile and compressive forces as well as torsional moments.

Alternatively, the end regions of reduced internal cross-section are circular so that the hollow member has tapered end regions.

Also according to the present invention, there is provided a process for the manufacture of rod-shaped hollow members of fibre reinforced plastics materials comprising the steps of forming a hose from a resilient material, the hose being so shaped as to correspond to the internal contours of the hollow member to be produced, applying the hose to an inner core or former, applying a fibrous material pre-impregnated with a synthetic resin to the hose and firmly pressing the fibrous material thereagainst, appylying windings to the ends of the core, locating the composite core thus produced in a hollow mould so that the ends of the hose project therefrom, sealing the hose and pressurising the hose to a desired internal pressure within the hollow mould and increasing the temperature to harden the synthetic resin, destroying the core and evacuating the hose and removing it from the thus-produced hollow component.

BRIEF DESCRIPTION OF THE DRAWINGS

Reference should now be made to the accompanying drawings. In the drawings, FIGS. 1 and 2 show longitudinal cross-sectional views through two different, known hollow members. The present invention will, however, be further described, by way of example, with reference to FIGS. 3 to 8, in which:

FIG. 3 shows a longitudinal cross-sectonal view through a first embodiment of a hollow member in accordance with the present invention;

FIG. 4 shows a longitudinal cross-sectional view through a second embodiment of a hollow member in accordance with the present invention.

FIG. 8 is an isometric end view of the embodiment of the invention shown in FIG. 4.

Figure 5:
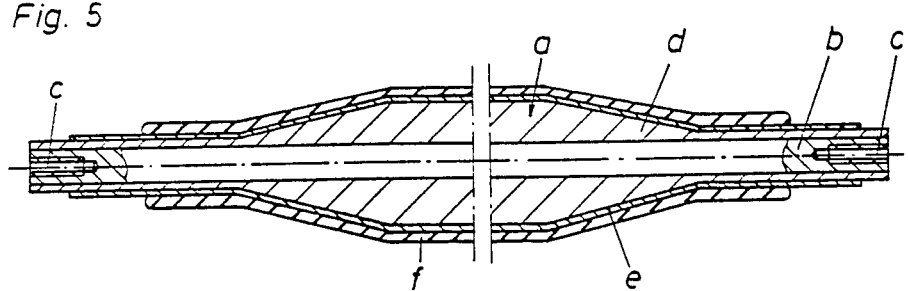
FIGS. 5 to 7 show various stages in the construction of a hollow member in accordance with the present invention.

The known hollow member shown in FIG. 1 comprises a tube 1 made from glass fibre-reinforced plastics material. The ends of the tube 1 are drawn or the external cross-section thereof in such end regions is reduced by any other suitable method. An aluminium or lightweight metal alloy end piece 2 is then fitted onto each of the reduced external diameter end portions and is secured to tube 1 by means of rivets 3.

The known embodiment shown in FIG. 2 differs from that shown in FIG. 1 in that the end pieces 2 are bonded onto tube 1. by a layer of adhesive 4. Such a connection can be effected more quickly and is more reliable than a riveted connection.

DESCRIPTION OF PREFERRED EMBODIMENTS

The first embodiment of a hollow member according to the present invention is illustrated in FIG. 3. The member comprises a tube 1 made of glass fibre-reinforced plastics material which is tapered inwardly in its end regions 5. The wall thickness of the tube 1 increases in the tapered end region in a direction towards the end of the tube, as can also be clearly seen in FIG. 3. In addition, a cone-shaped member 6, also made of glass fibre-reinforced plastics material is inserted into each end region 5. A clamping plate 7 made of an aluminum alloy is provided in each end region 5 during the manfacturing stage This clamping plate 7 includes a projection portion 8 which is provided with an external screw-thread. The screw-thread is used to connect the plate 7 to a connecting member 9, the member 9 being provided with a threaded sleeve 10 and a collar 11 against which the frontal surface 12 of the tube is pressed when the screw connection is tightened. The tapered end regions 5 may have an internal diameter at their free ends which amounts to only 1/5 of the internal diameter of the central portion of the tube 1.

If desired, the inner wall of each end region 5 may be provided with teeth 5t which mesh with corresponding teeth 7t formed in the clamping plate 7 and prevent relative rotation between the clamping plate 7 and the tube 1.

The embodiment shown in FIGS. 4 and 8 also comprises a tube 1 formed from glass fibre-reinforced plastics material which has a tapering end section 13 integrally formed therewith. The end section 13 is not, however, truly conical but does form an approximately conical transition between the circular cross-section of the tube 1 and a substantially rectangular cross-section at the free end of the end section 13. The longer side of the rectangular cross-section desirably has a length which is not smaller than the radius of the tube nor greater than the diameter of tube 1. The tapering end section 13 includes a projection portion 14 which also has a rectangular cross-section. Apertures 15 are formed in end section 13 to accept securing bolts or the like. These holes 15 may be provided with sleeves 16 made of titanium. The end sections 13 and the projections 14 may be stiffened by means of longitudinal ribs 17 and/or rods 18.

The tube 1 may be stiffened. Thus, two opposed strips may be provided which extend along the length of the tube. These strips may have a greater wall thickness than the tube itself. The thickness of these strips may be constant over the entire length of the tube or may vary in a stepwise fashion to accommodate the bending moments produced by bending forces acting on the tube. Furthermore, the ends of the tube and/or the connection regions may be provided with reinforcing windings (shown schematically in FIG. 4) on their external surfaces.

Carbon fibre reinforced plastics are also particularly suitable for use as the material to make the hollow members according to the present invention. The reinforcing fibres are preferably formed from a synthetic organic polymer such as Aramid.

The provision of an external skin of glass or Aramid fabric on the carbon fibre-reinforced plastics tube is advantageous. Such a skin protects the carbon fibres and also provides electrical insulation between the carbon fibres and a covering sheath or the like made of aluminium which may be applied to the tube.

The process for the manufacture of hollow members according to the invention is similar to the conventional hose technique in which a hose is coated with fibres impregnated with synthetic resin, the hose together with its coating is placed in a hollow mould, the hose is subjected to an internal pressure and the plastics material is hardened.

In the process of the present invention, a hose formed of a resilient material is drawn over a former or core having a shape corresponding to the internal shape of the hollow member to be manufactured. A fibrous material impregnated with synthetic resin is then applied to the hose and pressed firmly thereagainst. The impregnated fibrous material is thus also pressed firmly against the core. If necessary, circumferential windings may be applied to the ends. The core, the hose and the impregnated fibrous material are then placed in a thin-walled hollow mould which may, if necessary, have been treated with a mould release preparation. The projecting ends of the hose which have not been coated with the fibre/synthetic resin mixture can then be pushed back over the thin walls of the hollow mould so as to seal off, at both ends, the space between the hollow mould and the hose which has been filled with the mixture. The hose is then sealed at one end and pressurised from the other end. The entire assembly is then heated so that the synthetic resin hardens.

The hose is preferably formed from an isotropic elastic material and is preferably moulded to the desired internal shape of the hollow member in such a manner that it effectively corresponds to a stabilising rod, corresponding to the internal diameter of the component, which is mounted between two spherical members. These spherical members confer the desired accurate spherical shape on the internal wall of the member and also seal off the hose.

The core onto which the hose is drawn (as described above) is preferably formed from an expanded or foamed plastics material. Under the effect of the high temperature required for hardening the plastics and/or as a result of the pressure subsisting in the tube, the core collapses so that it can be removed from the finished hollow member.

Another way of making the core removable is to make is from a powdered evacuated material. Once the vacuum utilised for applying the laminate has been removed, the core material reverts to a pourable state and can be removed from the hollow member once the synthetic resin has hardened.

Alternatively the core may be formed from a low melting point material such as Wood's metal or ice. The hose is pulled onto the core and the synthetic resin/fibre mixture is applied thereto at a temperature below the melting point of the core material. The core material then melts at the temperature required for hardening the synthetic resin and can be removed from the hollow member.

The enlargement to which the hose is subjected and which is the difference between the largest internal diameter of the spherical portion and the internal cross-section of the finished hollow body is substantially 1:2; the inflation between the external diameter of the unit (comprising the core, the hose and the coating of synthetic resin and fibre mixture) and the external diameter of the finished hollow member should lie between 2% and a maximum of 5%, depending on quality requirements.

It has proved advantageous for the fibre material to consist of two laminates which extend over the entire length of the hollow member but which are applied to the hose in such a way that they overlap one another in an off-set manner. Removal of the hose from the finished hollow member can be considerably facilitated by evacuating the hose after the synthetic resin has hardened and the core has been removed. The clamping plates 7, which remain within the finished hollow member, can either be attached to the solid core within the hose or to the stabilising rod.

After removal of the hose it may be necessary to mill the contours of the connecting surfaces in a further treatment to give them their desired final shape. This is in addition to the drilling of the holes and to the fitting of the sleeves 16 if such are provided.

The mould used for carrying out this process is, to a certain extent, conventional in that it is a two-part sealable, hollow mould, the interior of which is manufactured so as to be the inverse of the hollow tube being manufactured.

For the manufacture of a hollow member with conical or tapering end sections, the mould is provided with terminal axial seating regions which serve to locate the solid internal core or the spherical members. In addition, the mould may be of a modular construction having two conical portions and one or more different, interchangeable cylindrical portions. Hollow members of different lengths can thus be manufactured utilising only a relatively small number of different mould components.

If hollow members are to be produced which have a taper in only one plane, the hollow mould may be provided with opposing peripheral gaps into which completely sealable moulds can be inserted. These gaps are advantageously located at the ends of the hollow mould. The body of the mould itself is in the form of an inverse of the region of the connecting surfaces of the hollow member.

Figure 6:
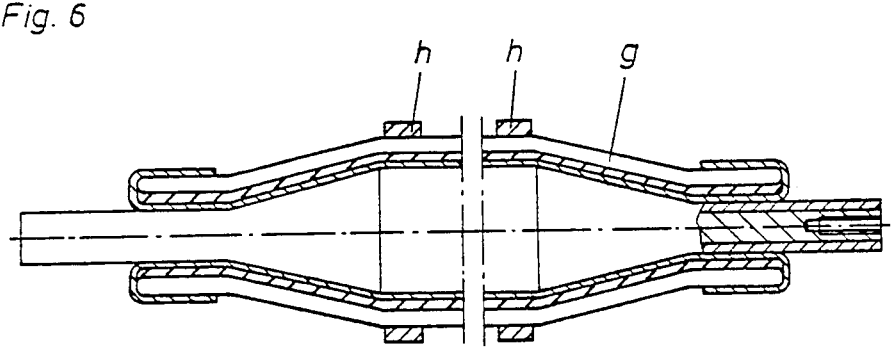
Figure 7:
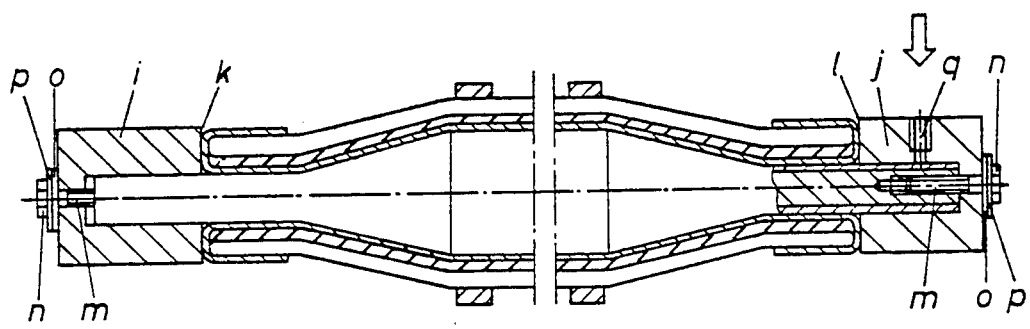

An example of an apparatus suitable for carrying out the process of the present invention will now be described with reference to FIGS. 5 to 7. In these Figures, there is shown a mould core a comprising a support rod b, which may be made of steel and which has threaded holes c formed therein at each end, and a core overlay d which corresponds to the internal shape of the object which is to be manufactured. The core overlay may consist of solid foamed polystyrene or Wood's metal, that is to say, it is destroyed by heating when the object being manufactured is hardened. Such destruction may be effected by the material charring or melting. A thin walled hose e, which may be made of rubber, is then drawn over the mould core. The extra length of the ends of the mould core a, which can be seen in the drawings, aids in the handling of the hose and its end portions.

A mass of fibre impregnated with synthetic resin is then applied to the hose e on mould core a in the form of a layer f. This layer f can be pressed on in a desired manner, as can be seen in FIG. 5.

The mould core a, provided with the coating e, is laid in one-half of a hollow mould g which is divided along its longitudinal plane. The second half of the mould is then located in position and is fixedly attached to the first mould half. If appropriate, a sealing ring h, as shown in FIG. 6, may be employed. The ends of the hose e projecting from the hollow mould g are pushed back over the end sections of the two halves of the hollow mould. This produces a sealed mould space with a substantially annular cross-section. The mould space is bounded internally and at its ends by the hose e and externally by the two halves of hollow mould g.

Caps i and j are then pressed against the ends of mould core a until their ring-shaped end surfaces k,l abut against the end surfaces formed by the turned-back hose ends. The caps i, j are secured against, and seal, the hose end surfaces by means of screws m which fit into the threaded holes c. A sealing washer o and a thrust or packing washer p are provided between the head n of each screw and the external end surface of the corresponding cap i or j. Cap j is provided with a threaded hole q through which compressed air or any other suitable pressurising medium can be introduced. The pressurising medium fills the ring-shaped gap between mould core a and hose e and layer f is firmly pressed against the hollow mould g from the interior in this way, as can be seen in FIG. 7.

The binding material in layer e is hardened by heating. The core overlay d is destroyed during this stage. Any loss in volume of the mould core a which may occur can be taken up by the flow of pressurising medium.

After hardening, the caps i, j are removed by removing the screws m. The ends of the hose are returned to their original shape and the mould halves are removed. The destroyed or molten material of the core overlay is removed through the space between the support rod b and the ends of the hose. The support rod b can be removed from the finished object together with the now limp hose e or the support rod may be removed before the hose.

What we claim is:

1. A tube-shaped hollow member of fibre-reinforced plastic material suitable for the transmission of compressive, tensile, bending and torsional forces in vehicles comprising a central portion with a substantially circular-shaped cross-section integrally formed with hollow end regions which are tapered conically inward from the central portion, and a pair of connector means for transmitting forces to respective ones of the hollow end regions, wherein each of the pairs of connector means includes a screw-threaded clamping plate pressing against the conical internal wall of the respective hollow end region, and a one-piece connecting member for connecting the tube-shaped hollow member to another device, the one-piece connecting member including a screw-threaded sleeve which extends into the respective hollow end region and is screw-threadably mounted on the clamping plate, and the one-piece connecting member also including an integral circular collar which presses against an annular frontal surface of the respective hollow end region extending essentially transversely to a longitudinal axis of the respective hollow end region.

2. A tube-shaped hollow member as claimed in claim 1, wherein each of the connecting members includes two straight parallel opposite spaced flat wall-like projections having a length not less than the radius of the central portion nor greater than the diameter thereof, and in which the wall-like projections of the connecting member contain holes which extend normally to the projections and cut the longitudinal axis of the tube-shaped hollow member.

3. A tube-shaped hollow member according to claim 1, wherein the conical internal wall is provided with teeth which mesh with teeth negatively formed in the clamping plate to assure the transmission of torsional forces.

4. A tube-shaped hollow member according to claim 1, wherein each of said screw-threaded clamping plates has a conically-shaped configuration essentially corresponding to the configuration of the conical internal wall of the hollow end region.

5. A tube-shaped hollow member according to claim 1, wherein a cone-shaped member of glass fiber-reinforced plastic material is inserted between said conical internal wall of each of said hollow end regions and said clamping plate.

* * * * *